United States Patent
Betz et al.

(10) Patent No.: US 7,658,250 B2
(45) Date of Patent: Feb. 9, 2010

(54) ENERGY STORAGE AND RECOVERY FOR A TRACKED MACHINE

(75) Inventors: Michael D. Betz, Knoxville, IL (US); Stephen C. Garnett, Princeville, IL (US); Chih C. Liang, Peoria, IL (US); Eric D. Stemler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 11/904,984

(22) Filed: Sep. 28, 2007

(65) Prior Publication Data

US 2008/0121448 A1    May 29, 2008

Related U.S. Application Data (60) Provisional application No. 60/847,913, filed on Sep. 29, 2006.

(51) Int. Cl.
*B60K 1/00* (2006.01)
(52) U.S. Cl. .................. 180/65.31; 180/65.8
(58) Field of Classification Search ............ 180/65.1, 180/65.225, 65.285, 242, 271, 197, 304, 180/308, 65.31, 65.8, 65.27; 60/598, 726, 60/784
See application file for complete search history.

(56) References Cited

U.S. PATENT DOCUMENTS

| | | | |
|---|---|---|---|
| 4,254,668 A | 3/1981 | Kessinger et al. | |
| 4,434,680 A | 3/1984 | Riediger et al. | |
| 4,998,591 A | 3/1991 | Zaunberger | |
| 5,195,600 A | 3/1993 | Dorgan | |
| 5,363,937 A | 11/1994 | James | |
| 5,586,613 A | 12/1996 | Ehsani | |
| 5,915,292 A | 6/1999 | Abels | |
| 5,991,677 A | 11/1999 | Kinugawa et al. | |
| 6,119,802 A * | 9/2000 | Puett, Jr. | 180/242 |
| 6,216,807 B1 | 4/2001 | Eckhoff | |

(Continued)

FOREIGN PATENT DOCUMENTS

DE    10 2004 009 030 A1    9/2005

(Continued)

OTHER PUBLICATIONS

Partial Search Report from PCT/US2007/021052.

*Primary Examiner*—Hau V Phan
(74) *Attorney, Agent, or Firm*—Finnegan, Henderson, Farabow. Garrett & Dunner (57) ABSTRACT

A system for storing and recovering energy associated with a machine having ground engaging tracks is disclosed. The system includes a power source configured to supply mechanical energy for operation of the machine, and an electric generator operably coupled to the power source. The electric generator is configured to convert at least a portion of the mechanical energy into electric energy. The system further includes an electric motor operably coupled to the electric generator. The electric motor is configured to supply power to the ground engaging tracks. The system includes an energy storage device configured to store energy associated with the machine, and a controller configured to divert a portion of the energy supplied by the power source to the energy storage device while the machine travels in a first direction, and recover energy stored in the energy storage device for use while the machine travels in a second direction.

19 Claims, 2 Drawing Sheets

U.S. PATENT DOCUMENTS

| | | |
|---|---|---|
| 6,260,465 B1 | 7/2001 | Zonak et al. |
| 6,282,897 B1 * | 9/2001 | Paul .......................... 60/598 |
| 6,358,176 B1 | 3/2002 | Nauheimer et al. |
| 6,418,707 B1 * | 7/2002 | Paul .......................... 60/784 |
| 6,450,283 B1 * | 9/2002 | Taggett ....................... 180/304 |
| 6,527,070 B2 | 3/2003 | Ryan |
| 6,678,972 B2 | 1/2004 | Naruse et al. |
| 6,691,806 B2 | 2/2004 | Wolfgang et al. |
| 6,705,030 B2 | 3/2004 | Tokunaga et al. |
| 6,708,787 B2 | 3/2004 | Naruse et al. |
| 6,725,581 B2 | 4/2004 | Naruse et al. |
| 6,745,117 B1 | 6/2004 | Thacher et al. |
| 6,877,577 B1 * | 4/2005 | Smith ......................... 180/242 |
| 6,958,549 B2 * | 10/2005 | Wakitani et al. ....... 180/65.285 |
| 6,962,550 B2 * | 11/2005 | Kadota .................. 180/65.285 |
| 7,151,355 B2 * | 12/2006 | Izumi et al. ............ 180/65.285 |
| 7,520,354 B2 * | 4/2009 | Morrow et al. .............. 180/271 |
| 2003/0226291 A1 | 12/2003 | Naruse et al. |
| 2004/0098983 A1 | 5/2004 | Naruse et al. |
| 2005/0187067 A1 | 8/2005 | Dobereiner |
| 2005/0263329 A1 | 12/2005 | Kuras et al. |
| 2005/0274555 A1 | 12/2005 | Betz et al. |
| 2007/0102209 A1 | 5/2007 | Doebereiner |

FOREIGN PATENT DOCUMENTS

| | | |
|---|---|---|
| EP | 1 452 710 A1 | 9/2004 |
| EP | 1 747 929 A1 | 1/2007 |
| WO | WO 94/09548 | 4/1994 |
| WO | WO 2007/040820 A1 | 4/2007 |

* cited by examiner

ENERGY STORAGE AND RECOVERY FOR A TRACKED MACHINE

This application claims the benefit of priority under 35 U.S.C. § 119(e) of U.S. Provisional Application No. 60/847,913, filed Sep. 29, 2006, the disclosure of which is incorporated herein by reference.

TECHNICAL FIELD

The present disclosure relates generally to systems and methods for storing and recovering energy associated with a machine and, more particularly, to systems and methods for storing and recovering energy associated with a machine having ground engaging tracks.

BACKGROUND

Machines having ground engaging tracks may be used in environments and for purposes where it is desirable to provide the increased traction associated with ground engaging tracks. For example, machines having ground engaging tracks may be used for construction and/or agricultural purposes, which often present the need to travel off-road. Conventional machines having ground engaging tracks include machines such as dozers and excavators, which may generally be powered using an internal combustion engine such as, for example, a compression-ignition engine. Such internal combustion engines may emit undesirable exhaust emissions and other pollutants during operation. In recent years, and for the foreseeable future, the reduction of exhaust emissions for internal combustion engines has become a regulatory priority. Furthermore, increasing the fuel efficiency of machines has also become more important, for example, to reduce increased costs associated with the rising price of fossil fuels and/or the reliance on imported oil.

Driven at least in part by new and future exhaust emissions regulations and a desire to reduce fuel consumption, alternative ways to power machines have been sought. One such alternative relates to the use of powertrains having electric components such as, for example, electric motors, generators, and electronic control systems. Such electric components have been used previously in some vehicle powertrain applications. The use of such electric components, however, in machines having ground engaging tracks may present a number of challenges not associated with the use of such electric components in other types of machines.

An example of a tracked vehicle having internal combustion engines combined with electric motors for propulsion is described in U.S. Pat. No. 6,691,806 (the '806 patent) issued to Wolfgang et al. on Feb. 17, 2004. The '806 patent describes a drive unit for a tracked vehicle having first and second electric generators and first and second internal combustion engines driving the generators to power two pairs of first and second electric motors, with each pair of electric motors for driving a track located on one side of the vehicle. The components are electrically-connected such that if the vehicle, especially a military vehicle, is partially damaged, the vehicle can continue to move.

Although the tracked vehicle of the '806 patent includes a combination of internal combustion engines, generators, and electric motors for movement, the '806 vehicle may not address problems associated with operating machines having ground engaging tracks.

The disclosed exemplary systems and methods for storing and recovering energy associated with a machine having ground engaging tracks may be directed to overcoming one or more of the problems.

SUMMARY

In one aspect, the present disclosure includes a system for storing and recovering energy associated with a machine having ground engaging tracks. The system includes a power source configured to supply mechanical energy for operation of the machine, and an electric generator operably coupled to the power source. The electric generator is configured to convert at least a portion of the mechanical energy into electric energy. The system further includes an electric motor operably coupled to the electric generator. The electric motor is configured to supply power to the ground engaging tracks. The system also includes an energy storage device configured to store energy associated with the machine, and a controller configured to coordinate operation of the power source, the electric generator, the electric motor, and the energy storage device. The controller is configured to divert a portion of the energy supplied by the power source to the energy storage device while the machine travels in a first direction, and recover energy stored in the energy storage device for use while the machine travels in a second direction.

According to another aspect, the disclosure includes a system for storing and recovering energy associated with a machine having ground engaging tracks. The system includes a power source configured to supply mechanical energy for operation of the machine, and an electric generator operably coupled to the power source. The electric generator is configured to convert at least a portion of the mechanical energy into electric energy. The system further includes an electric motor operably coupled to the electric generator. The electric motor is configured to supply power to the ground engaging tracks. The system also includes an energy storage device configured to store energy associated with the machine, and a controller configured to coordinate operation of the power source, the electric generator, the electric motor, and the energy storage device. The controller is configured to divert a portion of energy stored by the energy storage device to the electric motor, such that a portion of demand for power on the power source is at least partially offset by the portion of energy stored by the energy storage device in response to an increase in demand for power associated with operation of the machine.

According to a further aspect, the disclosure includes a system for storing and recovering energy associated with a machine having ground engaging tracks and a work implement. The system includes a power source configured to supply mechanical energy for operation of the machine, and an electrical system. The electrical system includes an electric generator operably coupled to the power source. The electric generator is configured to convert at least a portion of the mechanical energy into electric energy. The electrical system further includes an electric motor operably coupled to the electric generator. The electric motor is configured to supply power to the ground engaging tracks. The electrical system also includes a retarding device. The system includes an energy storage device configured to store energy associated with the machine, and a controller configured to coordinate operation of the power source, the electric generator, the electric motor, the retarding device, and the energy storage device, such that at least one of kinetic energy and potential energy associated with the vehicle is stored in the energy storage device and recovered to supply energy to the machine.

DETAILED DESCRIPTION

Figure 1:
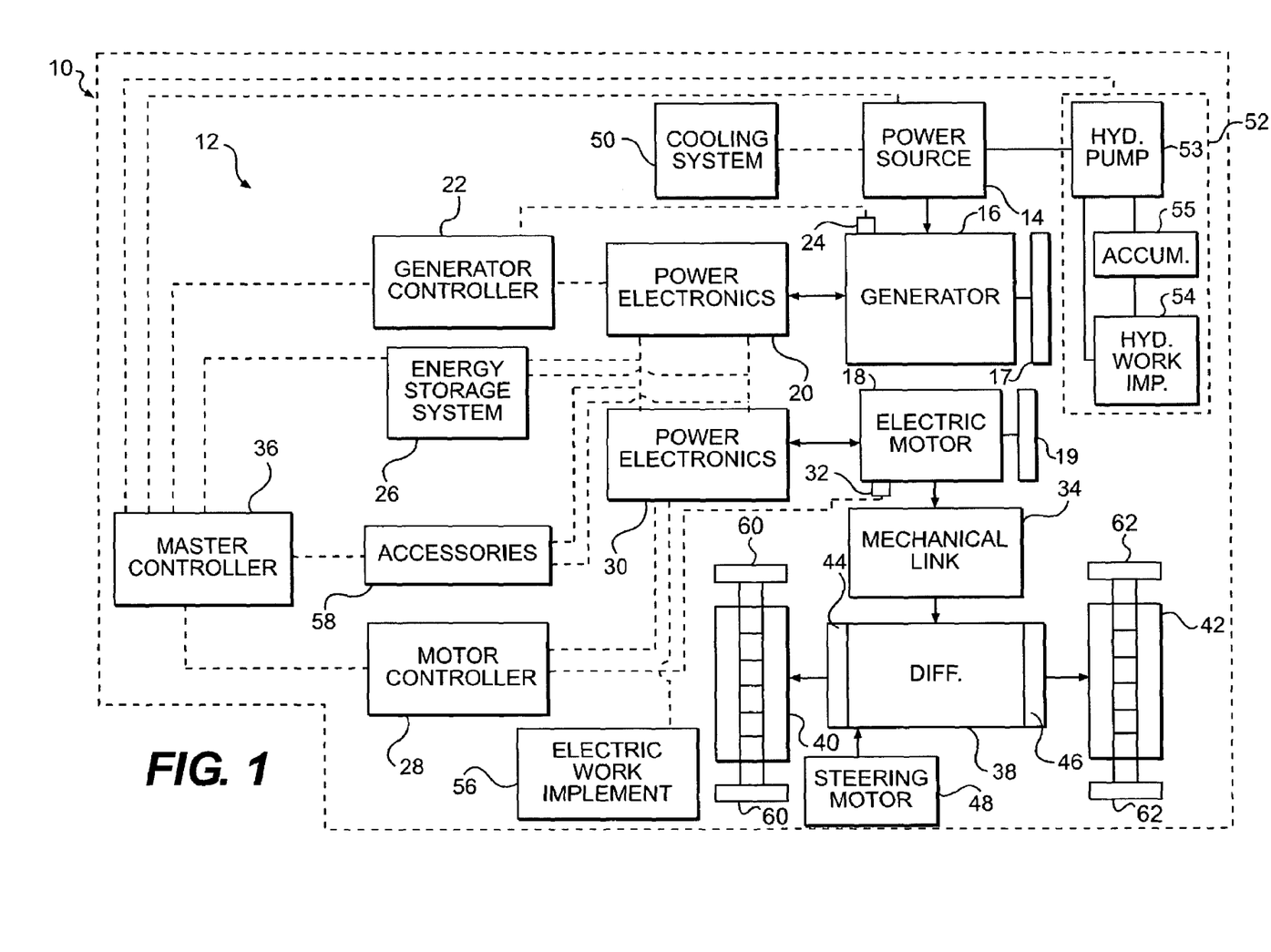
FIG. 1 is a schematic block diagram of a machine having an electric powertrain according to an exemplary disclosed embodiment.

FIG. 1 illustrates an exemplary machine 10. Machine 10 depicted in FIG. 1 may be, for example, a track-type tractor (e.g., a dozer), a track-type loader, a hydraulic excavator, an agricultural tractor, a skid-steer loader, a pipe layer, a track-type skidder (e.g., a forestry skidder), or another machine having ground engaging tracks.

Exemplary machine 10 schematically depicted in FIG. 1 includes an electric powertrain 12 configured to provide power for machine 10. For example, electric powertrain 12 may include a power source 14, for example, a diesel engine, a gasoline engine, a natural gas engine, a gas-turbine engine, or any other engine known in the art. Power source 14 may be operatively associated with a generator 16 and may drive generator 16 such that mechanical energy from power source 14 is converted into electric energy. Generator 16 may be any known AC or DC generator such as, permanent magnet, induction, switched-reluctance, or a hybrid combination of the above, and may also be sealed, brushless, and/or liquid cooled, for example, to provide a more durable design. According to some embodiments, generator 16 may be operably coupled to a flywheel 17. Generator 16 may be used to provide electric energy to power one or more electric motor(s) 18. According to some embodiments, electric motor(s) 18 may be operably coupled to a flywheel 19.

Electric powertrain 12 may further include power electronics 20 and a generator controller 22 operably coupled to a generator sensor 24, for example, a speed sensor. Power electronics 20 may include a power inverter, an inverter controller, and/or generator software configured to control the conversion of at least a portion of the mechanical energy supplied by power source 14 into electric energy. As an alternative (not shown), generator 16 may include a rectifier in place of power electronics 20. Generator controller 22 may be configured to control the conversion of alternating current from generator 16 into a high voltage direct current and may monitor generator 16's operation via generator sensor 24.

Electric powertrain 12 may also include an energy storage system 26. Energy storage system 26 may include any energy storage device such as, for example, a battery and/or an ultra-capacitor, a hydraulic accumulator (e.g., accumulator 55), and/or a flywheel (e.g., flywheel 17 and/or flywheel 19). For example, energy storage system 26 may be configured to provide any additional energy that may be desired when starting power source 14 and/or during operation of machine 10. For example, when machine 10 is operating in a low load condition, for example, it is neither traveling across the ground nor operating any of its work implements, power source 14 may continue to run at a desired speed or speed range, and/or load or load range. In such relatively low load conditions, it may be possible to operate machine 10 more efficiently, for example, and generator 16 can continue to convert mechanical energy into electric energy, which may be stored in energy storage system 26. Alternatively, for a situation in which machine 10 is traveling across the ground at a given speed, and the operator commands a work implement to perform a task such as, for example, the operator commands a bucket containing a load of dirt to be raised while machine 10 continues to move, energy storage system 26 may provide additional energy beyond the energy being generated by generator 16, and may prevent the power source 14 from lugging or stalling, and/or may prevent machine 10 from slowing down, for example, upon actuation of one or more work implements. Further, energy storage system 26 may permit power source 14 to be operated at a relatively low speed when less than full power is required, while still enabling powertrain 12 to adequately respond to sudden load increases without lugging or stalling power source 14. For example, energy storage system 26 may provide a power boost to powertrain 12 during such sudden load increases to supply sufficient power while the speed of power source 14 increases to accommodate the increased load. This may result in more efficient operation of power source 14.

According to some embodiments, energy storage system 26 may include one or more flywheels associated with rotating portions of powertrain 12. For example, flywheel 19 operably coupled to electric motor 18 may be used to store energy associated with rotation of electric motor 18. Once rotating, flywheel 19 may continue to drive rotation of electric motor 18 as power to electric motor 18 is reduced, with electric motor 18 then operating as a generator driven by flywheel 19, which, in turn, generates electric power that may be stored in energy storage system 26.

According to some embodiments, energy storage system 26 may include a flywheel (not shown) associated with power source 14. For example, the flywheel may be operably coupled to power source 14 via a friction clutch (not shown). During operation in which power source 14 is used to drive generator 16, the flywheel may be operably disconnected from power source 14 via the clutch. When powertrain 12 is being driven, for example, by the motion of machine 10 during slowing, generator 16 may be used to drive power source 14 as the speed of machine 10 is reduced. Under these conditions, the flywheel may be operably coupled to power source 14 via the clutch to store the rotational energy of the power source 14 as it is driven by generator 16. In this exemplary fashion, power source 14 may receive energy associated with directional changes of machine 10, downhill retarding of machine 10, and/or slowing of the speed of machine 10. This may result in machine 10 being able to change directions more rapidly as kinetic energy associated with the speed of machine 10 is converted to energy for storage by one or more of the energy storage devices of energy storage system 26, which may result in more rapid slowing of machine 10. Further, the energy stored via energy storage system 26 may be used to more rapidly accelerate machine 10 by supplementing power source 14.

According to some embodiments, electric powertrain 12 may include a motor controller 28, power electronics 30 operably coupled to electric motor 18 and at least one motor controller 28, and/or a motor sensor 32 such as, for example, a speed sensor. Power electronics 30 may include a power converter, an inverter controller, and/or motor software, and may be configured to convert and control electricity supplied to electric motor 18, thereby providing control of speed and torque for the propulsion of machine 10. Power electronics 30 may be housed in a compartment, which may be sealed and liquid cooled.

According to some embodiments, electric motor 18 may include more than one electric motor, and the schematic depiction in FIG. 1 of electric motor 18 may represent more than one electric motor such as, for example, two or more electric motors mechanically combined via a gear or gear train. By virtue of receiving electric energy from generator 16 and/or energy storage system 26, electric motor 18 creates torque for driving a mechanical link 34 such as, for example, a gear assembly. Electric motor 18 may be any known AC or DC motor such as for example, a permanent magnet motor, an induction motor, a switched-reluctance motor, or a hybrid combination of the above. Electric motor 18 be sealed, brushless, and/or liquid cooled.

Electric powertrain 12 may include a master controller 36 configured to control power source 14, generator controller 22, energy storage system 26, and/or motor controller 28, such that electric powertrain 12 may be operated in a coordinated and controlled fashion.

Mechanical link 34 may be operatively associated with a differential 38, such as, for example, a differential steering unit (e.g., a steering/propulsion unit at least similar to the differential steering unit disclosed in U.S. Pat. No. 4,434,680 issued to Riediger et al.), or any other known steering/propulsion unit, so as to match the speed and torque of electric motor 18 to the desired propulsion output. Differential 38 may be configured to transfer torque from mechanical link 34 to either or both of a pair of driving members 40 and 42 to operate ground engaging tracks 60 and 62. Differential 38 may include one or more planetary gear trains (not shown) that allow the amount of torque transferred from mechanical link 34 to each of driving members 40 and 42 to be adjusted according to operator commands.

Differential 38 may also be associated with braking devices 44 and 46 that may be configured to selectively apply a braking force resulting in a slowing of either or both of driving members 40 and 42. Alternatively, or in addition, electric motor 18 may operate as a generator, and/or generator 16 may operate as a motor, for example, during the braking of machine 10 and/or during the slowing of electric motor 18 and/or generator 16. For example, electric motor 18 may be configured and controlled such that machine 10 may be slowed while using electric motor 18 as a generator (e.g., as an electric retarding generator), thereby converting kinetic energy associated with machine 10 into electric energy, which may be stored in energy storage system 26. Further, generator 16 may operate as a motor, for example, to provide an input back into power source 14, so as to over speed power source 14 during periods in which electric powertrain 12 experiences an excess in energy. This may act to reduce fuel consumption and/or emissions from power source 14. As an alternative, this excess energy may be dissipated across a resistive grid (not shown).

According to some embodiments, braking devices 44 and/or 46 may include retarding devices, such as, for example, electric retarding generators associated with one or more of the ground engaging tracks of machine 10. For example, a retarding generator may include a generator configured to convert kinetic energy associated with machine 10 into electric energy, for example, while slowing movement of machine 10.

Electric powertrain 12 may further include a steering motor 48 operatively associated with differential 38 (i.e., when differential 38 is a differential steering unit). Steering motor 48 is configured to selectively adjust the amount of torque transferred to each of driving members 40 and 42, such that machine 10 can be propelled in a straight forward direction, a straight rearward direction, and turned while traveling in either the forward or reverse direction by virtue of selectively adjusting the amount of torque transferred to each of driving members 40 and 42 based on an operator's commands. Steering motor 48 may be powered by hydraulic fluid pressure, electricity, and/or other power sources. According to some embodiments, steering motor 48 may selectively adjust the torque transferred to driving members 40 and 42 by selectively either immobilizing, rotating in a forward direction, or rotating in a reverse direction, a portion (e.g., a ring gear) of one of the planetary gear trains of a differential steering unit, thereby biasing the torque applied to driving members 40 and 42.

A cooling system 50 may also be provided for machine 10 and may be configured to provide adequate cooling for the various systems of machine 10, including, for example, power source 14, generator 16, electric motor 18, mechanical link 34, differential 38, steering motor 48, power electronics 20 and/or 30, energy storage system 26, and/or a hydraulic system 52. Cooling system 50 may include a water (and/or ethylene glycol and/or other antifreeze/coolant fluid) and/or an oil cooling system associated with power source 14, which may be extended to provide cooling for one or more of the above mentioned systems.

In some embodiments, machine 10 includes a hydraulic system 52, which may be provided for operating various hydraulic components of machine 10 such as, for example, hydraulic actuators used for operating one or more hydraulic work implements 54, such as, for example, dozer blades, loader buckets, booms, sticks, excavator buckets, hydraulic pumps, and hydraulic motors. Alternatively, or in addition, work implements may be electric work implements 56 operated via electric power.

According to some embodiments, hydraulic system 52 may include one or more pumps 53 for pressurizing hydraulic fluid for operating the hydraulic actuators. Hydraulic system 52 may include a cooling system such as, for example, cooling system 50, for cooling the hydraulic fluid, which may experience an increase in temperature during operation of the various work implements. Alternatively, or in addition, hydraulic system 52 may include its own cooling system (not shown), which may include coolers and may be extended to cool other systems of machine 10 such as, for example, power source 14, generator 16, electric motor 18, mechanical link 34, differential 38, steering motor 48, power electronics 20 and/or 30, and/or energy storage system 26, which may be associated with machine 10.

According to some embodiments, energy storage system 26 may include accumulator 55, which may permit excess energy associated with hydraulic system 52 to be stored and used when desired. For example, when machine 10 is being operated in a manner such that less than full capacity of power source 14 is required, excess capacity of power source 14 may be used to charge accumulator 55 via hydraulic pump 53, which is driven by power source 14. Alternatively, or in addition, potential energy associated with hydraulic work implement 54 may be stored in accumulator 55. For example, if hydraulic work implement 54 includes a boom and bucket, when the boom and bucket are in a raised position, they may have potential energy by virtue of their raised position and gravity. As the boom and bucket are lowered, pressurized hydraulic fluid in actuators associated with the boom and bucket may be diverted into accumulator 55, thereby converting the potential energy into stored energy for later use. According to some embodiments, a flywheel (not shown) may be operably coupled to a hydraulic motor (not shown), which is driven by hydraulic pump 53. When the power supplied to the hydraulic motor has been decreased and the flywheel continues to rotate, the flywheel will continue to drive the hydraulic motor, which, in turn, may be used to drive hydraulic pump 53, such that pressurized hydraulic fluid from hydraulic pump 53 may be stored in accumulator 55.

Some embodiments of machine 10 may include one or more electric work implement(s) 56. For example, electric work implements 56 may include electric motor/generators (not shown) configured to perform work via electric power. Energy storage system 26 may be configured to convert kinetic energy associated with electric work implements 56 into energy for storage in, for example, batteries and/or capacitors. For example, electric work implements 56 may include actuators (not shown) operated by, for example, electric motors configured to drive pinion gears (not shown), which, in turn, may extend actuators having a rack gear (not shown). The electric motors may be configured to also operate as generators, for example, as electric work implement 56 is lowered, thereby driving the pinion gear via movement the rack. In this exemplary fashion, the lowering of electric work implements 56 may generate electric power, which may be stored via energy storage system 26 and/or may be diverted to electric-powered systems of machine 10.

Machine 10 may further include various accessories 58 such as, for example, a water pump for circulating cooling water (and/or ethylene glycol and/or other antifreeze/coolant fluid) from power source 14, an air conditioning compressor, a starter motor for starting power source 14, a block heater, an air inlet heater, and/or other various devices that may conventionally be powered by belts driven directly by power source 14. According to some embodiments, the accessories 58 may be driven by electric energy via electric motors, rather than by belts. This may provide more versatility in the placement of these devices on machine 10, since they are no longer required to be capable of being driven directly via power source 14 by one or more belts. This may also reduce parts and assembly costs as well as maintenance costs associated with belt failure and resulting replacement.

Figure 2:
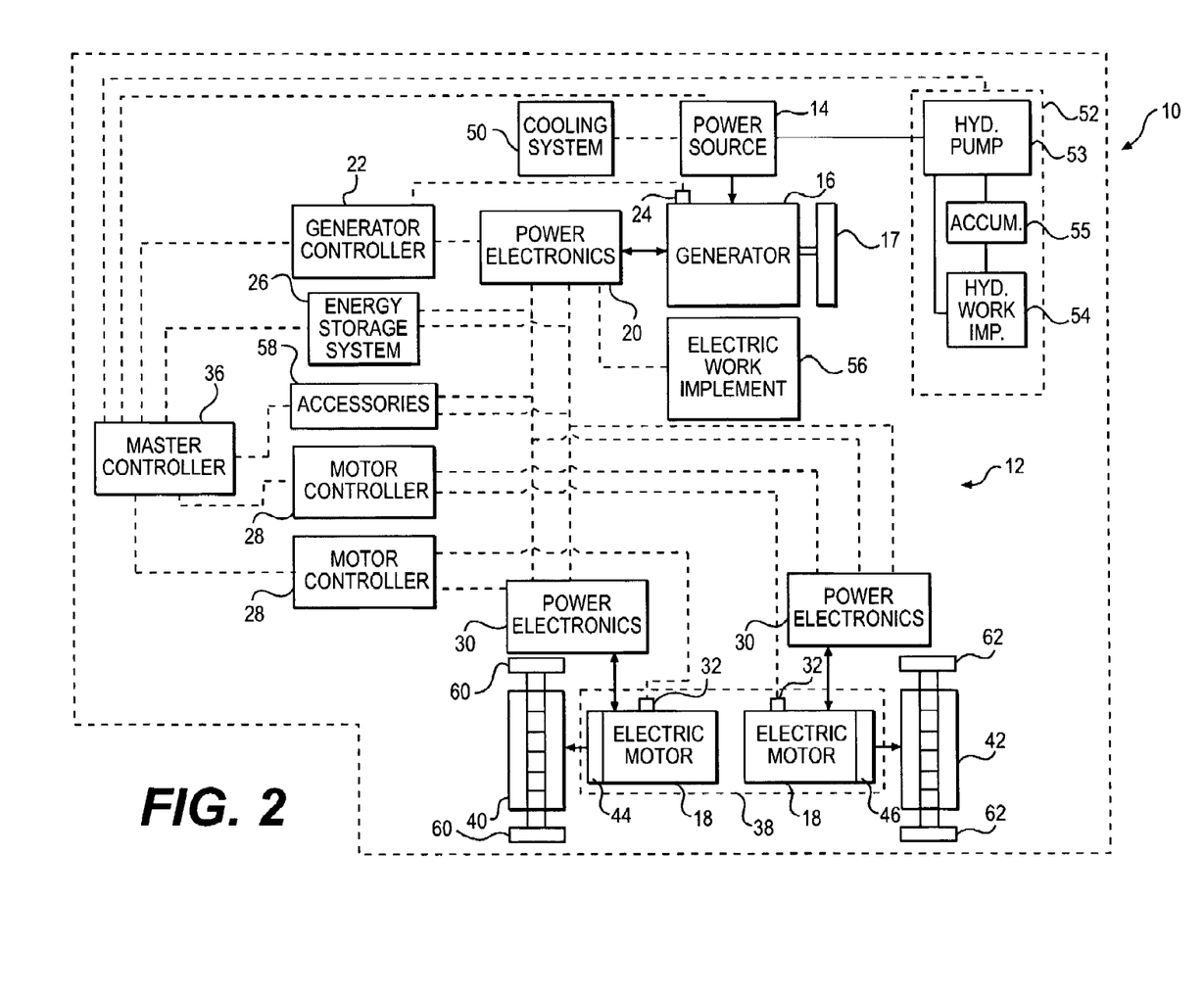
FIG. 2 is a schematic block diagram of a machine having an electric powertrain according to another exemplary disclosed embodiment.

FIG. 2 illustrates yet another exemplary embodiment of machine 10 having an electric powertrain 12. Electric powertrain 12 illustrated in FIG. 2 includes more than one electric motor 18 (i.e., two electric motors 18), each configured to drive one of the pair of ground engaging tracks 60 and 62. For example, generator 16 is electrically linked via power electronics units 20 associated with generator 16 and at least one (e.g., two) power electronics units 30 associated with the two electric motors 18. Each of the electric motors 18 are respectively coupled to driving members 40 and 42. Power electronic units 30 control the two electric motors 18 such that they may operate in a coordinated manner to propel vehicle in an operator-commanded direction. For example, by selectively applying more or less torque in either a forward or reverse direction to driving members 40 and 42, the electric motors 18 may propel machine 10 in a straight forward direction, a straight reverse direction, a direction curving to the left or right in the forward direction, or a direction curving to the left or right in the reverse direction (i.e., C-turns or S-turns). According to some embodiments, machine 10 may be able to perform pivot-turns (i.e., turns in which one ground engaging track remains substantially stationary and the other ground engaging track rotates in either the forward or reverse direction) and/or counter-rotations (i.e., turns in which machine 10 remains in substantially the same position, but rotates to a new orientation). Since electric motors 18 may selectively apply more or less torque to driving members 40 and 42 in either a forward or reverse rotational direction independently of one another, a differential steering unit, a steering motor, a power transfer device, and/or a steering clutch and brake system may be omitted from this embodiment.

INDUSTRIAL APPLICABILITY

Operation of the exemplary disclosed machines 10 having ground engaging tracks will now be described via examples.

Referring to FIG. 1, the exemplary disclosed power source 14 is operatively associated with generator 16 such that generator 16 is rotated, thereby converting mechanical energy from power source 14 to electric energy. Power source 14 may be operated at one or more predetermined speeds and/or loads (e.g., at a range of speeds and/or loads) such that its exhaust emissions are minimized and/or its fuel efficiency is maximized, since the speed and/or load on power source 14 is not directly related to the torque applied to track driving members 40 and 42. Furthermore, power source 14 and generator 16 may be operatively connected, for example, via appropriate gearing, such that generator 16 is driven at an optimum rotational speed and/or load for maximizing its electric energy conversion efficiency.

Power electronics 20 and generator controller 22 may be cooperatively associated with generator 16, for example, to control the conversion of the mechanical energy into electric energy. Power electronics 30 and motor controller 28 may be cooperatively associated with electric motor 18 to supply electric energy to electric motor 18 in a controlled fashion. Master controller 36 may control power source 14, generator controller 22, and/or motor controller 28, accessories 58, energy storage system 26, and/or a resistive grid (not shown) to optimize the power source speed and/or power source load, and/or to optimize generator speed and/or generator load, to reduce (e.g., minimize) exhaust emissions and/or to increase (e.g., maximize) the fuel efficiency of electric powertrain 12.

According to some embodiments, master controller 36 may maximize the electric energy conversion efficiency of generator 16. For example, master controller 36 may be used to allow power source 14 to operate at a relatively narrow speed and/or load range to maximize fuel efficiency and/or minimize exhaust emissions, regardless of the real time power requirements of machine 10. Furthermore, master controller 36 may be used to maximize the efficiency of the operation of generator 16 by optimizing its load and/or rotational speed.

Generator 16 may provide electric energy to energy storage system 26 and/or electric motor 18. For example, when machine 10's operator sends a command to electric powertrain 12, an appropriate amount of electric energy may be provided for electric motor 18. Electric motor 18 converts the electric energy into a torque and rotates in either a forward or reverse direction in accordance with the operator's command. The torque produced by electric motor 18 may be supplied to mechanical link 34, which converts the torque from electric motor 18 into an appropriate speed and direction for use by, according to some embodiments, differential 38. For example, differential 38 uses one or more planetary gear trains to transfer torque to each of driving members 40 and 42 in an appropriate amount. Steering motor 48 operates to control the amount of torque transferred to each of driving members 40 and 42. The transfer of substantially equal amounts of torque to each driving member 40 and 42 results in machine 10 traveling in a substantially straight line. Transferring relatively more speed to one of driving members 40 and 42 results in machine 10 traveling in a curvilinear fashion sometimes referred to as "C-turns" or "S-turns." According to some embodiments, machine 10 may be able to perform pivot-turns (i.e., turns in which one ground engaging track remains substantially stationary and the other ground engaging track rotates in either the forward or reverse direction) and/or counter-rotations (i.e., turns in which machine 10 remains in substantially the same position, but rotates to a new orientation). In order to assist with turning the machine 10, stopping machine 10's travel, and/or slowing machine 10's travel speed, either or both of machine 10's braking devices 44 and 46 may be activated to apply a resistive torque on driving members 40 and 42.

According to some embodiments, exemplary energy storage system 26 may be configured to store energy while machine 10 is operating under conditions that do not require the full capacity of power source 14's ability to supply power. Such stored energy may be recovered for use during periods of operation that require a greater supply of power. For example, while machine 10 is traveling in the reverse direction under conditions that do not require the full capacity of power source 14, excess energy supplied by power source 14 may be stored in energy storage system 26. Such stored energy may be recovered and used, for example, when the machine 10 reverses direction of travel (i.e., machine 10 begins to travel in the forward direction) and accelerates. Alternatively, or in addition, while machine 10 is traveling in the forward direction under conditions that do not require the full capacity of power source 14, excess energy supplied by power source 14 may be stored in energy storage system 26. Such stored energy may be recovered and used, for example, when the machine 10 reverses direction of travel (i.e., machine 10 begins to travel in the reverse direction) and accelerates. Such operation of machine 10 may result in improved fuel efficiency.

For machines having ground engaging tracks, relatively more power may be required to turn the machine than a wheeled machine, due at least in part, to the extra power needed to overcome the increased traction of the ground engaging tracks, which must slide as the machine performs a turn. As a result, a conventional machine having ground engaging tracks may not have sufficient power capacity to turn the machine while supplying power to other functions without reducing the power supplied to the other functions. For example, if the machine is simultaneously traveling at a particular speed, performing a turn, and operating one or more work implements, the power necessary for simultaneously performing those functions may be greater than the capacity to generate power by the power source. As a result, one or more of the functions may be performed more slowly than desired (or not performed at all) until the power requirements no longer exceed the capacity of the power source.

Exemplary energy storage system 26 may operate to substantially overcome any such power deficiencies. For example, energy stored in energy storage system 26 may be used, for example, to start power source 14 and/or to provide supplemental energy (e.g., electric or hydraulic energy) for operating various systems on machine 10, such as, electric motor(s) 18, work implements 54 and/or 56, steering motor 48, and/or accessories 58. For example, energy storage system 26 may also be used to provide supplemental energy (e.g., electric and/or hydraulic energy) when additional energy is needed, for example, when machine 10 is simultaneously being propelled, performing a turn, and operating one or more of work implements 54 and/or 56. Furthermore, energy storage system 26 may be configured to supply power to accessories 58, such as for example, an air conditioning unit and/or an electric water pump for circulating cooling fluid throughout power source 14 and/or various liquid cooled systems of machine 10.

According to some embodiments, exemplary energy storage system 26 may be configured to reduce peak power supply requirements on power source 14. For example, under certain conditions, operation of machine 10 may result in relatively sudden power requirements approaching or exceeding the maximum capacity of power source 14. During such peak loads, power source 14 may tend to react by quickly increasing the supply of power. Such quick increases in power supply by power source 14 may result in relatively inefficient operation and/or excessive exhaust and particulate emissions (e.g., if power source 14 is a compression-ignition engine). Exemplary energy storage system 26 may be configured to reduce the magnitude of power source 14's increase in power supply under such conditions. For example, energy stored by energy storage system 26 may be recovered for use to at least partially offset peak load requirements by supplying stored energy to electric powertrain 12. Such recovery of stored energy may result in improved fuel efficiency and/or reduced exhaust and particulate emissions of power source 14.

Machines having ground engaging tracks may often travel across hilly terrain having relatively step inclines. This may render it desirable to have a speed retarding system to prevent the machine from gaining too much speed when traveling down an incline. Further, by virtue of traveling up an incline, it may be desirable to prevent the machine's power source from lugging (i.e., from slowing to a speed of operation that causes the power source to stall or approach stalling). In addition, a machine having ground engaging tracks may be called upon to push piles of dirt or rock, or may be called upon to pull against a heavy or stationary object such as a stump, and it may be desirable to prevent the machine's power source from lugging under such conditions.

Exemplary machine 10's electric powertrain 12 may use braking devices 44 and 46, which may be configured to selectively apply a braking force resulting in a slowing of either or both of driving members 40 and 42. Braking may also be provided by operating retarding devices, such as, for example, electric retarding generators associated with one or more of round engaging tracks 62. Alternatively, or in addition, braking may also be provided by operating motor(s) 18 as generators configured to slow vehicle 10 via application of a power regenerative load to driving members 40 and 42. For example, as machine 10 travels down an incline, machine 10 may be slowed at least in part by a resistive torque developed by one or more of motor(s) 18 acting as generator(s) configured to convert the kinetic energy of machine 10 traveling down the incline via gravity associated into electric energy, and to deliver electric energy to machine 10 by, for example, storing electric energy in energy storage system 26. Alternatively, or in addition, electric motor(s) 18 may supply electric energy to generator 16, which may supplement power source 14's operation by supplying torque to power source 14. Alternatively, or in addition, the electrical energy generated by one or more motor(s) 18 may be dissipated across a resistive grid. In this fashion, electric powertrain 12 may serve as a speed retarding system that may also operate to convert kinetic energy associated with movement of machine 10 into stored energy for later use.

According to some exemplary embodiments of electric powertrain 12, electric powertrain 12 may operate such that power source 14 is substantially isolated from operation of electric motor(s) 18 and/or work implements 54 and/or 56. For example, when machine 10 travels up an incline, more power may be required for electric motor(s) 18 in order to provide sufficient power to propel machine 10 up the incline. Rather than power source 14 being called on to fully absorb the increased demand for power, energy storage system 26 may supply additional power to electric motor(s) 18 to propel vehicle 10 up the incline, such that power source 14 is not required to fully absorb the increased power demand.

For increased power demands associated with the operation of work implements 54 and/or 56, energy storage system 26 may supply additional power, either in the form of electric power stored in batteries and/or capacitors, or in the form of hydraulic power stored in accumulator 55. In addition, if machine 10 is called upon, for example, to push piles of dirt or rock, or pull against a heavy or stationary object such as a stump, energy storage system 26 may supply supplement power source 14's energy with sufficient energy to substantially prevent power source 14 from lugging. Further, electric powertrain 12 may be configured to maximize drawbar pull, for example, when pulling heavy or stationary objects by, for example, optimizing the amount of slip of ground engaging tracks 60 and 62. This may also result in substantially isolating power source 14 from the load placed on electric powertrain 12, which may substantially prevent lugging of power source 14.

Machines having ground engaging tracks may perform cycling operations. Cycling operations are operations in which the use of a machine may require repeated starting, stopping, and reversing of direction. For example, a bulldozer may push dirt in a forward direction, stop, reverse direction, stop again, and then push dirt in the forward direction again. Another example of such cycling occurs during a typical operation of a track-type loader, which may repeatedly move forward while picking up a load of dirt, move in a reverse direction while carrying the load, turn, move in a forward direction while carrying the load, lift the load, and dump the load into a dump truck, and reverse direction to back away from the dump truck. These exemplary cycles are often repeated many times in relatively quick succession. During such cycling operations, the kinetic energy associated with moving the machine must be absorbed when the machine reverses direction.

According to some embodiments, electric powertrain 12 may also may be configured such that motor(s) 18 operate as generators (e.g., as electric retarding generators) configured to slow machine 10 via application of a resistive torque on driving members 40 and 42. For example, motor(s) 18 may apply a torque resistant to machine 10's direction of travel, which acts to slow machine 10. In this manner, the kinetic energy associated with machine 10's speed is converted into electric energy, which may be used to operate other power consuming devices of machine 10 and/or may be stored by energy storage system 26. As a result, the repeated stopping associated with cycling operations may be used to generate electric power. Braking devices 44 and 46 may also be used in addition to (or instead of) motor(s) 18 to stop machine 10's travel.

Machines having ground engaging tracks sometimes include one or more work implements for performing tasks, which may be operated via, for example, one or more hydraulic cylinders actuated by a hydraulic system. For example, the actuation of one or more hydraulic actuators, such as hydraulic motors and cylinders, may be used to raise and lower the blade of a dozer, and/or raise and lower the bucket of a front-end loader or an excavator. Such hydraulic systems may include one or more pumps for imparting pressure to the hydraulic system. Such pumps may generally be driven via a power source such as an internal combustion engine. As a result, the power source may not only be used to propel a machine, but it may also be used to power various work implements actuated by hydraulic actuators. Consequently, as the demands placed on the hydraulic pump(s) are increased, for example, when a load in an excavator bucket is raised, the power source may be called upon to provide more power.

Exemplary electric powertrain 12 may be configured to provide sufficient power to simultaneously propel machine 10 and operate one or more work implements 54 and/or 56 without necessarily affecting machine 10's speed and/or load on power source 14. For example, energy storage system 26 may be configured to supplement power supplied by power source 14 in order meet the power needs for simultaneous operation of electric motor(s) 18, steering system 38, and work implements 54 and/or 56. As a result, power source 14 may be able to operate at a more consistent speed and/or load, which may result in more efficient operation and reduced emissions, along with a reduced likelihood of lugging. Further, this may result in more responsive operation of machine 10, for example, by virtue of machine 10 being propelled via electric power supplemented by energy storage system 26 and work implements 54 and/or 56 being operated via hydraulic power, which may also be supplemented by energy storage system 26 via, for example, an accumulator.

Exemplary cooling system 50 may be used to cool power source 14 along with the various elements of electric powertrain 12, which may be sealed and liquid cooled. In particular, generator 16 and/or electric motor 18 may be sealed and liquid cooled to provide a more durable and compact design such that, for example, electric motor 18 has a higher power density and lower inertia, rendering it capable of stopping and reversing directions more quickly and efficiently.

According to some embodiments (not shown), machine 10 may include an electric powertrain 12 having an electric motor 18 operably connected in a direct fashion to differential 38 (e.g., a differential steering unit) to provide torque directly to differential 38. The torque transferred to differential 38 is used to drive driving members 40 and 42 in a similar manner as described with reference to the exemplary embodiment shown in FIG. 1.

The exemplary embodiment shown in FIG. 2 includes two electric motors 18. Generator 16 is operably coupled to each of electric motors 18, and each of electric motors 18 is coupled to a respective one of driving members 40 and 42. Generator 16 may be operably coupled to power electronics 20, generator controller 22, and generator sensor 24, and each electric motor 18 may be operably coupled to a respective motor controller 28, a respective power electronics unit 30, and a respective motor sensor 32. Master controller 36 may control generator controller 22 and motor controllers 28, which in turn, respectively control power electronics 20 associated with generator 16 and each of power electronics 30 associated with each of electric motors 18, such that they may operate in a coordinated manner to propel machine 10 in an operator-commanded direction. For example, by selectively supplying more or less torque in either a forward or reverse direction to driving members 40 and 42, electric motors 18 may propel machine 10 in a straight line or in a curvilinear fashion (e.g., in the form of C-turns or S-turns) in either the forward or reverse direction, or electric motors 18 may operate such that machine 10 performs pivot-turns.

According to some embodiments, (not shown) electric powertrain 12 may include more than two electric motors 18. For example, machine 10 may include three electric motors 18 configured to provide input into differential 38. Generator 16 may be operably coupled to each of electric motors 18, and each of electric motors 18 may be operably coupled to steering system 38, which, in turn, is operably coupled to driving members 40 and 42.

It will be apparent to those skilled in the art that various modifications and variations can be made to the disclosed machine having an electric powertrain. Other embodiments will be apparent to those skilled in the art from consideration of the specification and practice of the disclosed machine. It is intended that the specification and examples be considered as exemplary only, with a true scope being indicated by the following claims and their equivalents.

What is claimed is:

1. A system for storing and recovering energy associated with a machine having ground engaging tracks, the system comprising:
   a power source configured to supply mechanical energy for operation of the machine;
   an electric generator operably coupled to the power source, the electric generator being configured to convert at least a portion of the mechanical energy into electric energy;
   an electric motor operably coupled to the electric generator, the electric motor being configured to supply power to the ground engaging tracks;
   an energy storage device configured to store energy associated with the machine; and
   a controller configured to coordinate operation of the power source, the electric generator, the electric motor, and the energy storage device,
   wherein the controller is configured to divert a portion of the energy supplied by the power source to the energy storage device while the machine travels in a first direction, and recover energy stored in the energy storage device for use while the machine travels in a second direction.

2. The system of claim 1, wherein the first direction is forward, and the second direction is reverse.

3. The system of claim 1, wherein the first direction is reverse, and the second direction is forward.

4. A system for storing and recovering energy associated with a machine having ground engaging tracks, the system comprising:
   a power source configured to supply mechanical energy for operation of the machine;
   an electric generator operably coupled to the power source, the electric generator being configured to convert at least a portion of the mechanical energy into electric energy;
   an electric motor operably coupled to the electric generator, the electric motor being configured to supply power to the ground engaging tracks;
   an energy storage device configured to store energy associated with the machine; and
   a controller configured to coordinate operation of the power source, the electric generator, the electric motor, and the energy storage device,
   wherein the controller is configured to divert a portion of energy stored by the energy storage device to the electric motor, such that a portion of demand for power on the power source is at least partially offset by the portion of energy stored by the energy storage device in response to an increase in demand for power associated with operation of the machine.

5. The system of claim 4, wherein the increase in demand for power associated with operation of the machine includes an increase in load on the electric motor.

6. The system of claim 4, wherein the increase in demand for power associated with operation of the machine relates to steering the machine.

7. The system of claim 4, wherein the increase in demand for power associated with operation of the machine relates to operation of a work implement.

8. A system for storing and recovering energy associated with a machine having ground engaging tracks and a work implement, the system comprising:
   a power source configured to supply mechanical energy for operation of the machine; and
   an electrical system including:
      an electric generator operably coupled to the power source, the electric generator being configured to convert at least a portion of the mechanical energy into electric energy,
      an electric motor operably coupled to the electric generator, the electric motor being configured to supply power to the ground engaging tracks, and a retarding device;
   an energy storage device configured to store energy associated with the machine; and
   a controller configured to coordinate operation of the power source, the electric generator, the electric motor, the retarding device, and the energy storage device, such that at least one of kinetic energy and potential energy associated with the machine is stored in the energy storage device and recovered to supply energy to the machine, wherein the kinetic energy associated with the machine includes motion of the machine, and the retarding device includes a retarding generator configured to convert motion of the machine into electric energy for use by the electrical system.

9. The system of claim 8, wherein the retarding generator is configured to convert motion of the machine into electric energy while the motion of the machine is slowing.

10. The system of claim 8, wherein the retarding generator is configured to convert motion of the machine into electric energy while the vehicle is reversing directions of motion.

11. The system of claim 8, wherein the retarding generator is configured to convert motion of the machine into electric energy while the machine is traveling in reverse direction.

12. The system of claim 8, wherein the controller is configured to transfer energy from the energy storage device to the electrical system while the machine is turning.

13. The system of claim 8, wherein the controller is configured to transfer energy from the energy storage device to the electrical system during operation of the work implement.

14. The system of claim 8, wherein the controller is configured to transfer energy from the energy storage device to the electrical system as the machine accelerates.

15. The system of claim 8, wherein the controller is configured to transfer energy from the energy storage device to the electrical system as the machine accelerates upon reversing directions of motion.

16. The system of claim 8, wherein the controller is configured to transfer energy from the energy storage device during a peak load on the power source, thereby reducing power output requirement of the power source during the peak load.

17. The system of claim 8, wherein the electrical system includes electrically-powered accessories, and the controller is configured to transfer energy from the energy storage device to the accessories.

18. The system of claim 17, wherein the accessories include a heater configured to warm at least one of the power source and air supplied to the power source.

19. The system of claim 8, wherein the potential energy includes energy due to an elevated position of the work implement, and wherein the controller is configured to transfer energy to the energy storage device during lowering of the work implement.

* * * * *